US007794547B2

(12) United States Patent
Mann

(10) Patent No.: US 7,794,547 B2
(45) Date of Patent: Sep. 14, 2010

(54) FLUE PAN WASHER FOR MAPLE SUGAR EVAPORATOR

(76) Inventor: David Shrader Mann, 210 Highmeadows Rd., Waterville, VT (US) 05492

( * ) Notice: Subject to any disclaimer, the term of this patent is extended or adjusted under 35 U.S.C. 154(b) by 980 days.

(21) Appl. No.: 11/498,399

(22) Filed: Aug. 3, 2006

(65) Prior Publication Data

US 2008/0029129 A1 Feb. 7, 2008

(51) Int. Cl.
*B01D 17/00* (2006.01)

(52) U.S. Cl. ........................... 127/2; 122/379; 122/394; 127/9; 134/172; 134/198; 134/199; 210/180; 159/22

(58) Field of Classification Search ..................... 127/2, 127/9, 53–58; 134/34, 36, 198, 172, 199; 159/26.1, 26.2, 46, 22, 23; 210/175, 180, 210/513, 523–526, 538, 540; 122/379, 390, 122/394; 239/750–752
See application file for complete search history.

(56) References Cited

U.S. PATENT DOCUMENTS 240,621 A * 4/1881 Stubbs ........................ 159/36
268,310 A * 11/1882 Stevens ....................... 159/32
884,272 A * 4/1908 Grimm ........................ 159/46
974,475 A * 11/1910 Daniels ....................... 159/38
1,023,896 A * 4/1912 Voss ............................ 159/46
1,423,583 A * 7/1922 Steps .......................... 210/772
1,709,783 A * 4/1929 Etheredge ................ 210/242.1
1,991,471 A * 2/1935 Snow et al. .................... 15/317
2,257,362 A * 9/1941 Zitkowski ................ 210/198.1
2,709,427 A * 5/1955 Perlman ..................... 126/113
2,709,428 A * 5/1955 Perlman ..................... 126/113
2,870,762 A * 1/1959 Skerritt ........................ 126/113
3,220,883 A * 11/1965 Howard ........................ 127/16
3,377,026 A * 4/1968 De Mart et al. ............. 239/752
4,796,602 A * 1/1989 Atkinson et al. ........... 126/59.5
4,819,615 A * 4/1989 Richardson et al. ............ 127/9
5,221,297 A 6/1993 Childress et al.
5,275,666 A * 1/1994 Goodrich et al. ............... 127/9
5,389,209 A * 2/1995 Paquette ....................... 203/14
5,697,392 A * 12/1997 Johnson et al. ............. 134/176
5,772,774 A 6/1998 Chabot

* cited by examiner

*Primary Examiner*—Joseph W Drodge
(74) *Attorney, Agent, or Firm*—Thomas G. Ference

(57) ABSTRACT

The present invention is directed to an automatic washer system mounted within a maple sugar evaporator above the rear flue pan for removing niter and sediment built up during the boiling of sap. The evaporator comprises a furnace, a steam hood, a pan and a nozzle for washing the pan. The steam hood extends over the furnace. The pan is mounted to the furnace and under the steam hood. The nozzle is mounted over the pan. Cleaning fluid is sprayed from the nozzle to clean the pan by an automated process.

25 Claims, 6 Drawing Sheets

FLUE PAN WASHER FOR MAPLE SUGAR EVAPORATOR

FIELD OF THE INVENTION

This invention relates to an evaporator for producing maple syrup. More specifically, it relates to an automatic washer system mounted above the rear flue pan of the evaporator for removing niter and sediment built up during boiling of the sap.

BACKGROUND OF THE INVENTION

In concentrating maple syrup, sap collected from maple trees is fed into an evaporator having an open pan mounted on top of a wood or oil furnace. Heat supplied by the furnace causes the sap to boil and water is evaporated from the sap to leave concentrated syrup. Large scale commercialization in this industry has added various improvements to the evaporation process to improve efficiency. Most commercial evaporators now include a rear flue pan and one or more finishing pans. The larger rear flue pan has a multitude of flues in the base of the pan to increase the amount of heated surface area contacting the sap, this increases evaporation efficiency. The forward finishing pans are used to precisely concentrate the syrup to its final sugar content. A steam hood is mounted over all pans for directing steam out of the sugar house. To reduce the boiling time, a process of reverse osmosis (RO) may also be employed to concentrate the sap prior to entering the evaporator.

During the evaporation process, not only the sugar content of the sap is increased, but also that of various impurities present in sap. The primary impurity is niter (potassium nitrate), which deposits onto the evaporation pans. Residual impurities can contribute to several deleterious effects in the maple sugaring process and must be periodically removed by washing the evaporator pans. Small quantities of these impurities can degrade the quality of the flavor and color of the syrup. If left to build up on the pans, they can act as an insulator degrading thermal conduction between the sap and furnace decreasing the efficiency of evaporation. Thicker layers cause the stainless steel pan to over heat. This generates large stresses within the pan leading to distortion or cracking of the pan.

The front, finishing pans are usually small and easily detached from the furnace. They can be switched with a set of clean pans some times as often as every 4-6 hours of boiling time. The unclean finishing pans are cleaned when off of the evaporator by hand or with a portable washer. The larger rear flue pan, however, is typically 6×10 feet and not easily removed from the furnace. The rear flue pan must be washed in place with limited accessibility due to the steam hood above it. Washing occurs manually, is time consuming and hindered by the multitude of flues located in the bottom of the pan. With the added use of the reverse osmosis process, impurity concentrations are increased and sediments build more quickly in the rear flue pan requiring it to be cleaned more frequently.

In general, the prior art provides for no automated method or apparatus for the cleaning of evaporator pans while the pans are mounted on a maple sugar evaporator.

SUMMARY OF THE INVENTION

One aspect of the present invention is directed to a system for cleaning an evaporator comprising a washer for mounting within an evaporator.

Another aspect of the present invention is directed to an evaporator comprising a furnace, a steam hood, a pan and a nozzle for washing the pan. The steam hood extends over the furnace. The pan is mounted to the furnace and under the steam hood. The nozzle is mounted over the pan.

Still another aspect of the present invention is directed to a method of cleaning an evaporator comprising the steps of providing an evaporator having a furnace, a steam hood and a pan. The steam hood extends over the furnace. The pan extends over the furnace and under the steam hood. Providing a nozzle mounted over the pan and under the hood. Spraying cleaning fluid from the nozzle to clean the pan by an automated process.

BRIEF DESCRIPTION OF DRAWINGS

The foregoing and other aspects and advantages of the invention will be apparent from the following detailed description of the invention, as illustrated in the accompanying drawings, in which.

DETAILED DESCRIPTION OF THE INVENTION

Figure 1:
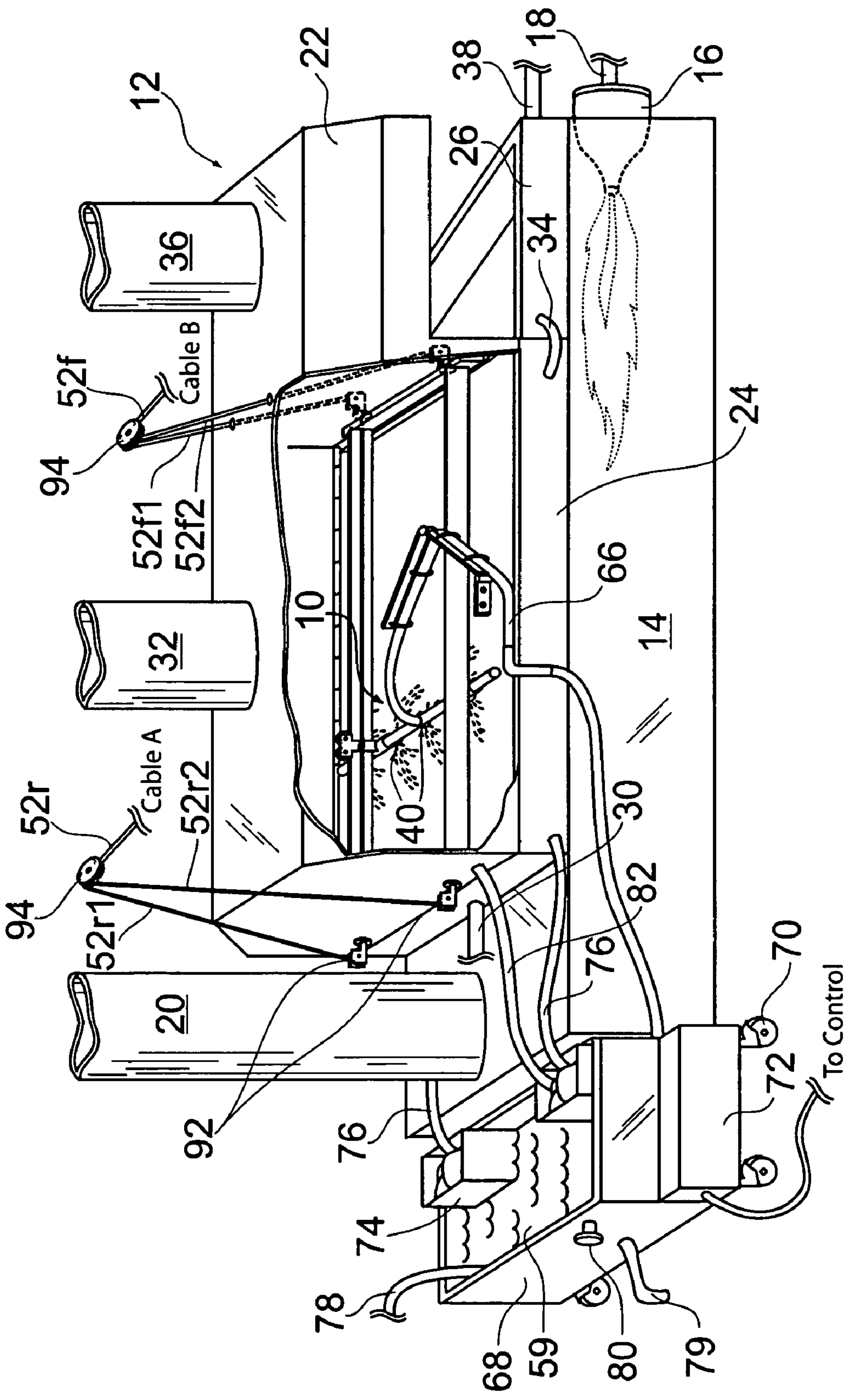
FIG. 1 is a cut away, perspective view of one embodiment of a maple sugar evaporator illustrating the incorporation of a permanently mounted, automated washer system for the rear flue pan.
Figure 2:
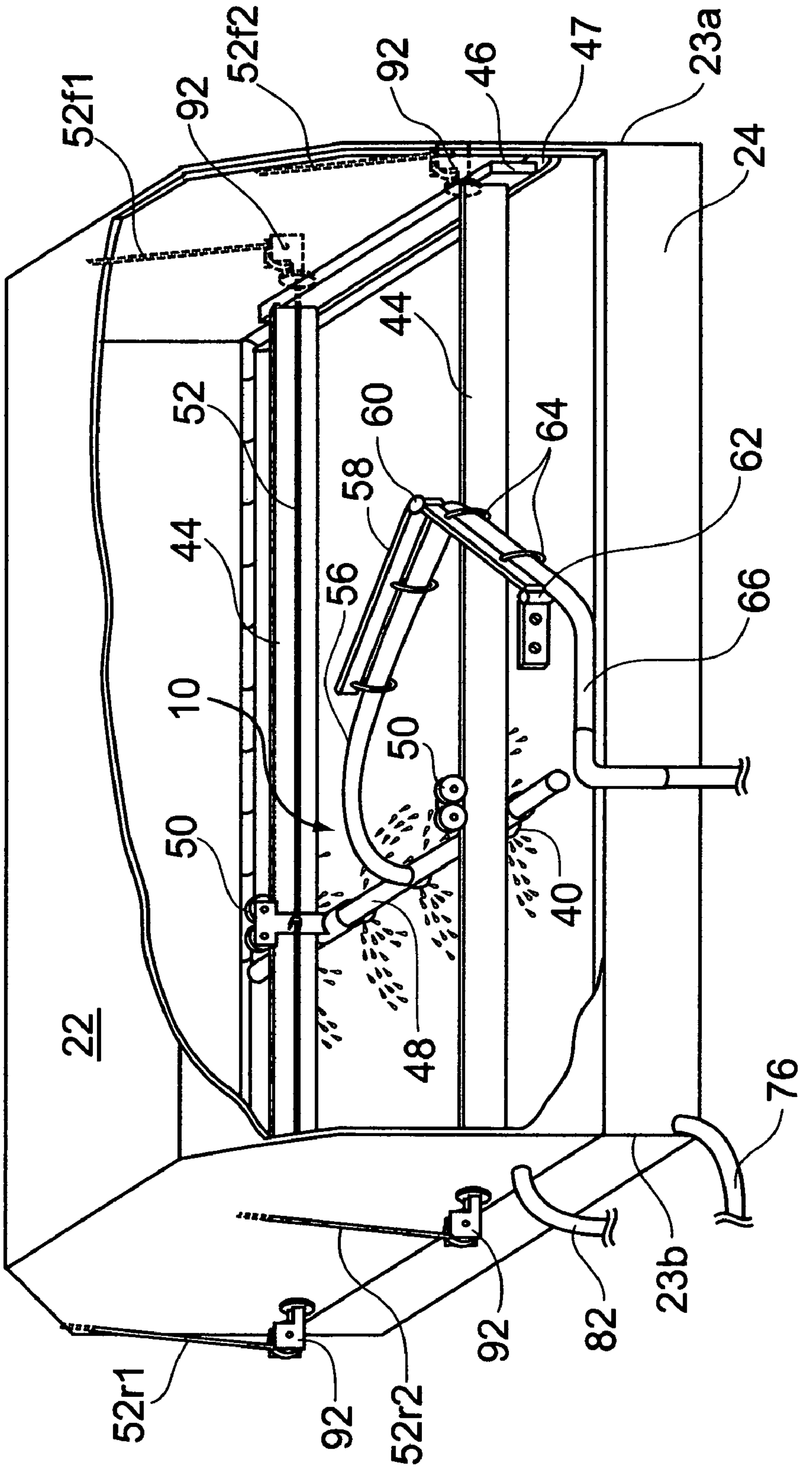
FIG. 2 is a cut away view of the steam hood in FIG. 1 showing a perspective view of the washer system.
Figure 3:
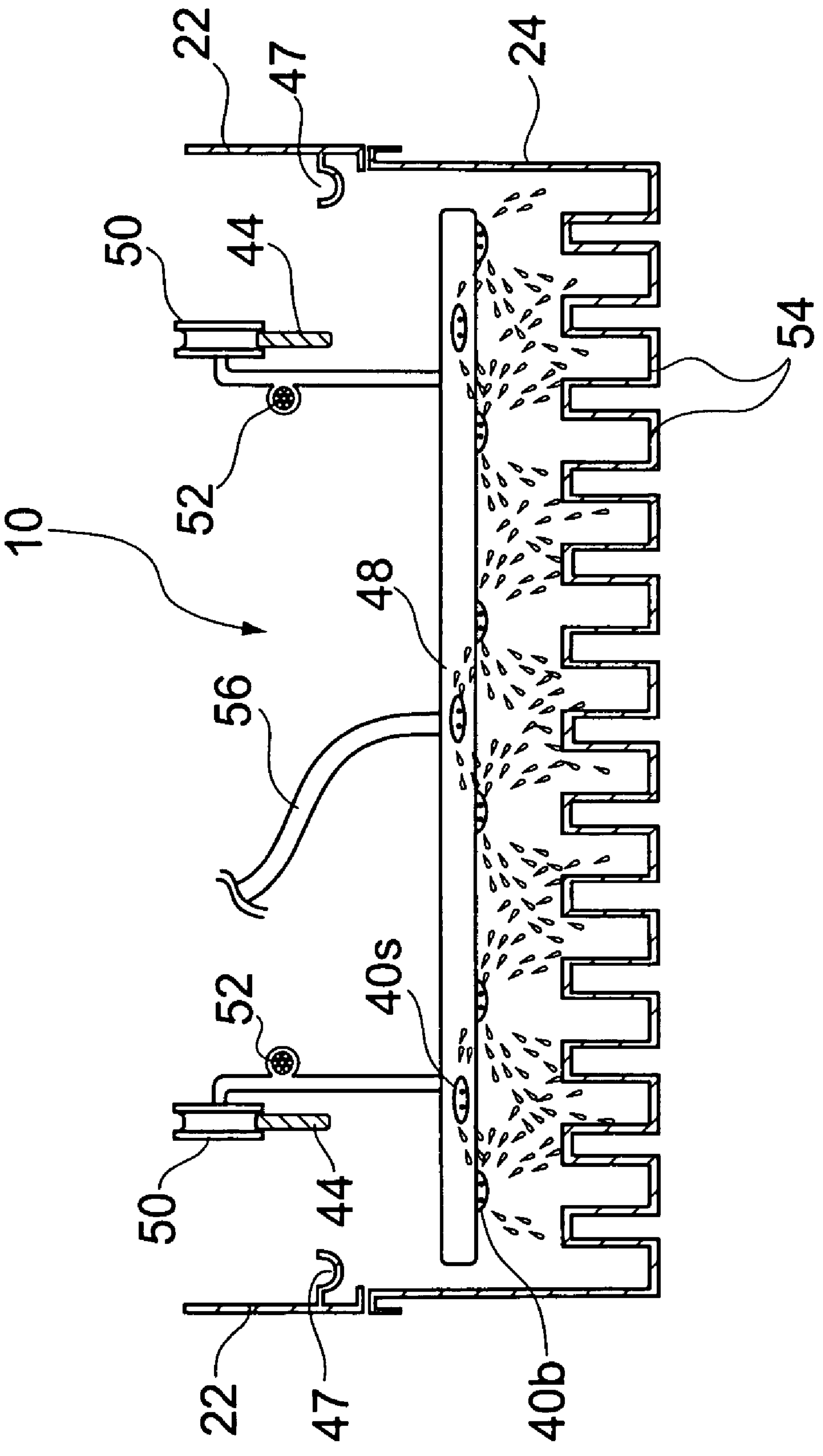
FIG. 3 is a partial sectional, side view showing details of the nozzle manifold that mounts on a track above the flue pan depicted in FIG. 2.
Figure 4:
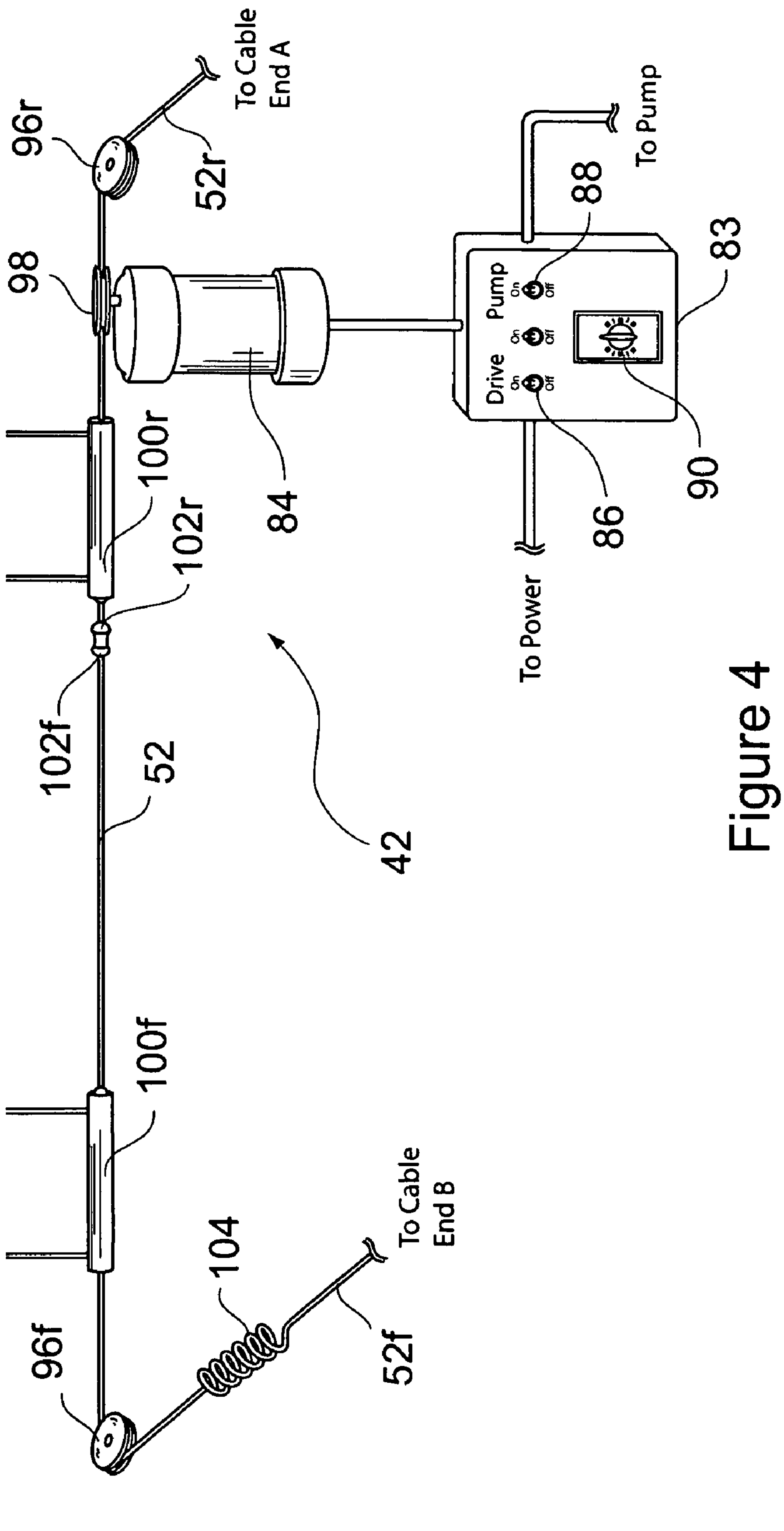
FIG. 4 is a perspective view of the drive system mounted on a wall near the evaporator to drive the washer depicted in FIG. 2 back and forth across the length of the flue pan.

FIG. 1 illustrates one embodiment of an automated washer 10 mounted within a maple sugar evaporator 12. In this embodiment washer 10 is permanently mounted to stay within the evaporator during the evaporation process and used after each boiling. Evaporator 12 comprises a furnace 14 that may be heated by the burning of wood, oil or coal. When oil is used, burner 16 is mounted to furnace 14 with oil supplied through oil feed 18. Combustion is exhausted from furnace 14 through exhaust chimney 20. A steam hood 22 extends over furnace 14. Mounted to furnace 14 and under steam hood 22 are upwardly open rear flue pan 24 and finishing pan(s) 26 usually made of stainless steel. Maple sap enters rear flue pan 24 through sap inlet 30. The sap is boiled in rear flue pan 24 to remove most of the water. Water vapor from the rear flue pan is exhausted out of the sugar house through rear vapor chimney 32. Concentrated sap flows from rear flue pan 24 into finishing pan 26 via transfer pipe 34. The sap is further concentrated in finishing pan 26. Water vapor generated from the finishing pan is exhausted through front vapor chimney 36. Maple syrup with the proper concentration of sugar is drawn off finishing pan 26 via syrup outlet 38. One or more nozzles 40 for washing flue pan 24 after each boiling are mounted within evaporator 10 over rear flue pan 24. Nozzles 40 may be completely or partially contained within the volume defined by the base, sidewalls and upper edge of pan 24, or they reside outside this volume.

A track washer embodiment with an external drive system 42 is illustrated in FIGS. 1-4. Washer 10 comprises two parallel stainless steel tracks 44 mounted within steam hood 22 and held in place by mounts 46. Mounts 46 are connected to the opposite ends of tracks 44 and rest in drip trough 47 that runs along the bottom edge of the steam hood. Washer 10 may be lifted away from rear flue pan 24 by lifting steam hood 22. A tubular manifold 48 with an array of attached spray nozzles 40 spans the width of flue pan 24. Spray manifold 48 is suspended from trolleys 50 that travel on two parallel tracks 44 that run the full length of flue pan 24. Trolleys 50 are driven back and forth along tracks 44 by stainless steel cables 52 connected to drive system 42. Nozzles 40 are located along the bottom and sides of manifold 48. Nozzles 40 spray downward and horizontally into the flues 54 of pan 24. Nozzles 40 are configured to spray the entire bottom of flue pan 24, each end of the pan and the sides of the pan. Typical nozzles 40 might be threaded ⅛-inch brass fittings with a fan spray orifice. Bottom nozzles 40*b* to spray the bottom of flue pan 24 may operate using 0.8 gpm at 40 PSI and produce an 80-degree spray angle. Side nozzles 40*s* to spray the walls of flue pan 24 may operate using 0.5 gpm at 40 PSI and produce a 120-degree spray angle. Many different types of structures can be used as nozzles 40 including structures with holes, slits and multiple hole sprinkler heads.

A flexible hose 56 supported by arm 58 supplies cleaning solution 59 to manifold 48, the cleaning fluid exits through nozzles 40. Flexible hose 56 is preferably a high temperature food grade hose such as BUNA-N/PVC capable of withstanding temperatures up to 250° F. Movable arm 58 swivels both from the center point 60 and at the point of mounting 62 to pan 24. Arm 58 supports flexible hose 56 with rings 64. Flexible hose 56 receives cleaning solution 59 via cleaning solution supply line 66 from holding vat 68 located external to evaporator 12. Flexible hose 56 with moveable arm 58 allows spray manifold 48 to be supplied with cleaning solution 59 no matter where the manifold is positioned along flue pan 24. In an alternative embodiment arm 58 and flexible hose 56 can be combined into a swivel supply pipe that has rotatable connections that allow liquid to pass through.

Holding vat 68, located outside evaporator 12, preferably has wheels 70 that allow it to be moved around the sugar house providing maximum flexibility as to where it is located within the sugar house. Holding vat 68, however, could be permanently mounted to the evaporator. Holding vat 68 has a pump 72 integrated with it for circulating cleaning solution 59. Holding vat 68 should be large enough to provide a continuous flow of cleaning solution 59 through the whole wash system when pump 72 is activated. Holding vat 68 also has mounted within it at least one filter 74 that filters cleaning solution 59 returning by gravity feed from evaporator 12 through cleaning solution return lines 76. Filter 74 may be a reusable nylon mesh bag having porosity in the range of 50 to 1000 microns or other suitable filter. Holding vat 68 is filled through fill pipe 78 preferably with clean water generated as a byproduct of the reverse osmosis process used to concentrate the maple sap prior to boiling. Holding vat 68 may also be filled with water that condenses on the inside of steam hood 22 during the evaporation process. This clean water collects in drip trough 47 along the bottom edge of hood 22 and is gravity fed into holding vat 68 by drip return 82. Holding vat 68 may further comprise a heater 80 for heating cleaning solution 59 to a desired temperature for improved cleaning. Dirty cleaning solution may be removed from holding vat 68 through drain 79.

A drive system 42 for track washer 10 is mounted outside of evaporator 12 preferably on the wall of the sugar house.

Drive system 42 comprises a control box 83 supplied with power. Control box 83 includes a drive motor power switch 86 for drive motor 84 and a pump power switch 88 for pump 72. Control box 83 also includes a timer 90 to regulate the time of the wash cycle. Drive cables 52 attached to trolleys 50 pass out through both ends of steam hood 22, around pulley 92, up to the ceiling and around double wheel pulleys 94. The two cables 52*r*1 and 52*r*2 coming from the rear of evaporator 12 become one cable 52*r* at this point. From here the cable 52*r* travels to a wall pulley 96*r*, around drive motor pulley 98, along the wall to another wall pulley 96*f* and back to connect to two cables 52*f*1 and 52*f*2 coming up from the front end of steam hood 22. This completes a loop that will pull manifold 48 in either direction as drive motor 84 turns in each direction. Two limit switches 100*f* and 100*r* mounted on the wall set the length of travel. When limiter 102*r* and limiter 102*f*, respectively, touch limit switch 100*r* and limit switch 100*f*, they activate the reversing relays in control box 83 reversing the direction of travel of washer 10. Two springs 104 in line with cables 52*f* and 52*r* keep tension on drive cable 52.

The in place automatic washer 10 described above is used at the end of each evaporation. Residual sap is drained from flue pan 24. After all the sap has been removed an initial water flush is recommended. The user then sets timer 90 to a predetermined time and turns on pump power switch 88. Pump 72 circulates cleaning solution 59 from holding vat 68 into cleaning solution supply line 66. Cleaning solution 59 continues into flexible hose 56 held by arm 58. Cleaning solution 59 then enters manifold 48 and exits through nozzles 40. Cleaning solution 59 sprays downward into flues 54 of flue pan 24. Sprayed cleaning solution 59 containing sediment, niter and other impurities exits flue pan 24 by gravity feed through solution return lines 76 to holding vat 68 where it is filtered and re-circulated.

During the sap evaporation process, spray manifold 48 of washer 10 is parked at its home position at the front end of flue pan 24. Once cleaning commences and cleaning solution 59 is spraying through nozzles 40, the user turns on drive motor power switch 86 to activate travel of manifold 48 along tracks 44. Drive system 42 uses cables 52, pulleys (92, 94, 96) and reversing drive motor 84 to move spray manifold 48 back and forth along the length of flue pan 24 between opposite ends 23*a* and 23*b*. Two limit switches 100*f* and 100*r* set the length of travel and activate the reversing relays in control box 83 allowing spray manifold 48 to reverse directions at each end of flue pan 24. Timer 90 sets the total wash time. When the wash cycle is completed, spray manifold 48 travels to the front of flue pan 24 where it remains at its home position within steam hood 22 during the next sap evaporation.

The washing action of washer 10 may be fully automated by incorporating various automatically controlled sensors and valves and by integrating a computer with control box 83. For example, holding vat 68 may be filled with water coming from either the reverse osmosis process or water from the evaporation process. The water coming from the RO process is cold and water coming from the evaporation process is hot. Ideally one would like to use as much hot water from the evaporation process as possible to save energy required to heat RO water. However, it is possible that not enough hot evaporation water will be generated during the evaporation process to fill holding vat 68. In this case a computer could sense the water level from a level sensor in holding vat 68 and automatically actuate valves to fill the vat to the desired level. The computer could further tell a heater to heat the cleaning solution to a desired temperature. Other aspects of the washer system could also be automated. For example one might further incorporate sensors to detect impurity concentrations and cleaning chemical concentrations.

Numerous mechanical and electrical variations to the automated, in-place washer 10 described above are also possible without deviating from the scope of this invention. One embodiment might include a washer 10 that has a drive system 42 attached to the outside of evaporator 12 instead of mounted on the wall. This type of drive system would involve mounting a drive motor with drive shaft, pulleys and limit switches on steam hood 22. Similarly, the drive system might also be mounted within hood 22 as long as proper design parameters were taken into account for the high temperature steam environment. Another embodiment might be including nozzles 40 that rotate on spray manifold 48 to give different spray patterns that may be more effective in cleaning pans with different flue structures. In yet another embodiment, washer 10 might be adapted to an evaporator having a flue pan 24 but no steam hood 22. In such an embodiment the washer may be mounted directly to the flue pan 24.

Figure 5:
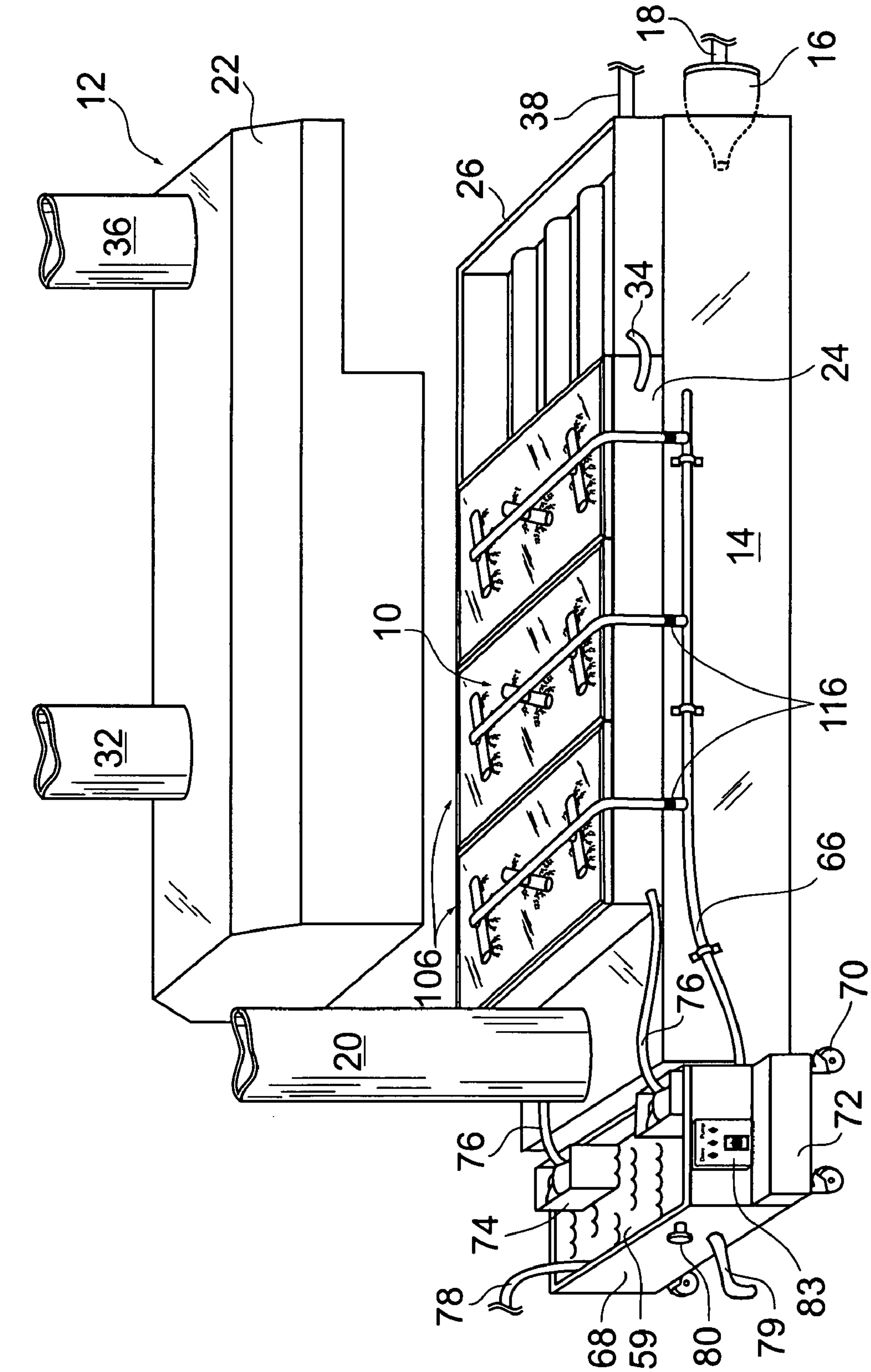
FIG. 5 is a perspective view of another embodiment of a maple sugar evaporator illustrating the incorporation of removable panels for automated washing of the rear flue pan.
Figure 6:
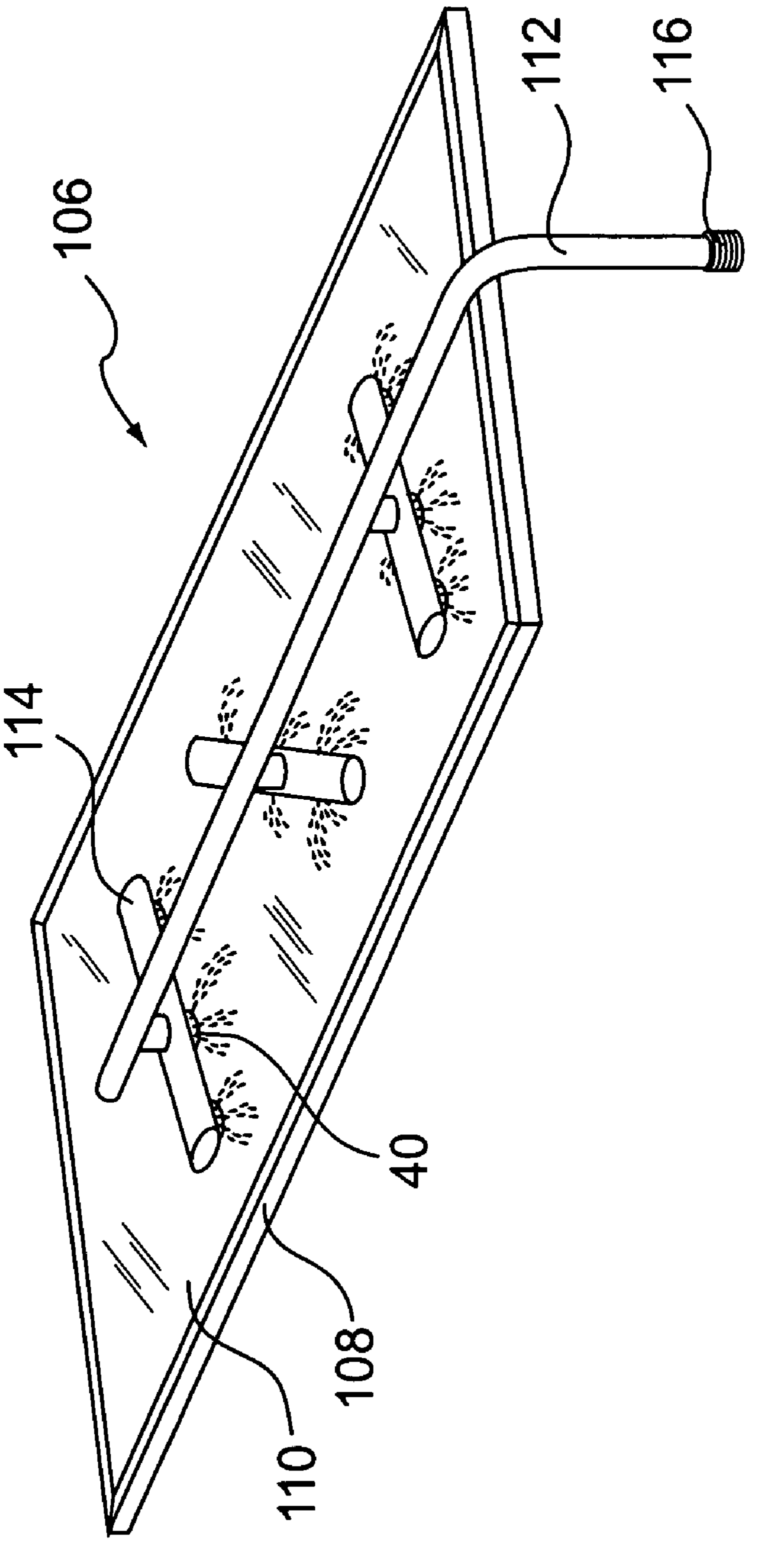
FIG. 6 is a perspective view of a removable panel with nozzles for cleaning the rear flue pan as depicted in FIG. 5.

In another alternative embodiment, FIGS. 5 and 6 illustrate an automated washer 10 mounted to several wash panels 106 for temporary installation within a maple sugar evaporator 12. In this embodiment steam hood 22 is raised approximately 12-inches after the evaporation process is complete. Residual sap is drained from rear flue pan 24. Wash panels 106 are slid in under steam hood 22 and mounted on top of rear flue pan 24 covering the full length of the pan. Typically there are 3 to 6 wash panels 106 depending on the length of flue pan 24. Each wash panel 106 comprises a aluminum frame 108, a PLEXIGLASS® support sheet 110 mounted to each frame, a panel supply line 112 and nozzles 40. The metal frame 108 adds strength and support, while a clear sheet allows for observation during the wash cycle. Nozzles 40 may be single nozzles spaced along the length of supply line 112 or they may be a plurality of nozzles that are attached so as to allow rotation or translation of the nozzle through sprayer arm 114. Panel supply line 112 of each wash panel 106 is quick-coupled to cleaning solution supply line 66 by connectors 116 to make set up and removal of the panels convenient. Control box 83 is mounted to holding vat 68. Setting timer 90 and turning on pump power switch 88 activates the washing process. Cleaning solution 59 is pumped from holding vat 68 by pump 72 through supply line 66 and into panel supply lines 112. Cleaning solution 59 enters sprayer arm 114 and exits through nozzles 40. Cleaning solution 59 sprays downward and sideways into flue pan 24. Sprayed cleaning solution 59 containing sediment, niter and other impurities exits flue pan 24 by gravity feed through solution return lines 76 to holding vat 68 where it is filtered and re-circulated. After the washing process is complete, wash panels 106 are disconnected at connectors 116 and removed from rear flue pan 24. Steam hood 22 is lowered and evaporator 12 is clean and ready to process a new batch of maple sap.

Whether using either a permanently mounted in place washer or one for temporary installation, a typical cleaning process for rear flue pan 24 may include one or more process steps. An example of cleaning process steps may be as follows. After draining the sap, washer 10 is activated with a hot water flush to remove residual sugar and sediment. The hot water process is typically 5 minutes with the water at approximately 150° F. Holding vat 68 is then drained and a cleaning solution of 0.5 gallons of phosphoric acid to 125 gallons of water is mixed in holding vat 68. This solution may or may not be heated. The phosphoric acid solution is sprayed for 2-4 hours. The dilute phosphoric acid solution dissolves the niter and any other impurities that precipitated out during the evaporation process onto stainless steel flue pan 24. This phosphoric acid solution is then dumped and holding vat 68 filled with clean water. For the final rinse step the water is sprayed for 10-15 minutes. The above process may differ in the type of chemicals used, the concentration of solutions and duration of washing.

The invention is not limited to the embodiments represented and described above but includes all variants notably those concerning the types of nozzles used, the manner in which the nozzles are mounted over the pan and the type of drive system used to move the nozzles over the pan to wash it. Nothing in the above specification is intended to limit the invention more narrowly than the appended claims. The examples given are intended only to be illustrative rather than exclusive.

What is claimed is:

1. An evaporator, comprising:

a) a furnace;

b) a steam hood extending over said furnace;

c) a pan mounted to said furnace having a bottom and a length extending between opposite ends, said pan under said steam hood; and d) at least one nozzle for washing the bottom and ends of said pan, said at least one nozzle supported to move along a track above said pan, said track running the length of the pan between said ends of said pan, said track mounted within said evaporator.

2. An evaporator as recited in claim 1, wherein said at least one nozzle is mounted to a moveable arm.

3. An evaporator as recited in claim 1, wherein said track is mounted to said steam hood.

4. An evaporator as recited in claim 1, further comprising a drive system for moving said at least one nozzle.

5. An evaporator as recited in claim 4, wherein said drive system passes through said steam hood.

6. An evaporator as recited in claim 4, wherein said drive system includes at least one component selected from the group of a controller, drive motor, cable, pulley and limit switch.

7. An evaporator as recited in claim 1, wherein said at least one nozzle is connected to a source of cleaning solution housed external to the evaporator.

8. An evaporator as recited in claim 1, wherein said pan includes a drain.

9. An evaporator as recited in claim 1, wherein said at least one nozzle is a plurality of nozzles.

10. An evaporator as recited in claim 9, wherein said plurality of nozzles are mounted to a manifold.

11. An evaporator as recited in claim 1, wherein said track is two parallel tracks.

12. An evaporator, comprising:

a) a furnace;

b) a steam hood extending over said furnace;

c) a pan mounted to said furnace having a bottom and a length extending between opposite ends, said pan under said steam hood; and d) at least one nozzle over said pan; and e) a drive system for moving said at least one nozzle to wash the bottom and ends of said pan, said drive system operable for moving said at least one nozzle the length of said pan between said ends of said pan, said drive system extending through said steam hood.

13. An evaporator as recited in claim 12, wherein said at least one nozzle is mounted to a moveable arm.

14. An evaporator as recited in claim 12, wherein said drive system includes at least one component selected from the group of a controller, drive motor, cable, pulley and limit switch.

15. An evaporator as recited in claim 12, wherein said at least one nozzle is connected to a source of cleaning solution housed external to the evaporator.

16. An evaporator as recited in claim 12, wherein said at least one nozzle is a plurality of nozzles.

17. An evaporator as recited in claim 16, wherein said plurality of nozzles are mounted to a manifold.

18. An evaporator, comprising:

a) a furnace;

b) a pan mounted on top of said furnace having a bottom and a length extending between opposite ends;

c) at least one nozzle for spraying cleaning solution, said at least one nozzle mounted over said pan; and d) a drive system mounted to move said at least one nozzle between said opposite ends, said drive system operable for moving said at least one nozzle the length of said pan between said opposite ends of said pan.

19. An evaporator as recited in claim 18, wherein said drive system includes at least one component selected from the group of a controller, drive motor, cable, pulley and limit switch.

20. An evaporator as recited in claim 18, wherein said at least one nozzle is connected to a source of cleaning solution housed external to said pan.

21. An evaporator as recited in claim 18, wherein said at least one nozzle is a plurality of nozzles.

22. An evaporator as recited in claim 18, wherein said cleaning solution is for removing at least one material from the group including niter, sediment and sugar.

23. An evaporator as recited in claim 18, wherein said at least one nozzle lifts away from said pan.

24. An evaporator as recited in claim 18, wherein said at least one nozzle spans the width of said pan.

25. An evaporator as recited in claim 18, further comprising limit switches to switch the direction of movement of said at least one nozzle.

* * * * *